United States Patent [19]

Farah et al.

[11] Patent Number: 4,859,738

[45] Date of Patent: Aug. 22, 1989

[54] ENVIRONMENTAL STRESS FAILURE RESISTANT POLYCARBONATE BLEND

[75] Inventors: Hani Farah, Sugarland; Chai J. Chou, Missouri City; Don R. Roden, Jr., Hitchcock, all of Tex.

[73] Assignee: The Dow Chemical Company, Midland, Mich.

[21] Appl. No.: 268,104

[22] Filed: Nov. 7, 1988

[51] Int. Cl.$^4$ ............................................. C08L 69/00
[52] U.S. Cl. ..................................... 525/67; 525/439; 525/445
[58] Field of Search .......................... 525/439, 445, 67

[56] References Cited

U.S. PATENT DOCUMENTS

| | | | |
|---|---|---|---|
| 3,431,224 | 3/1969 | Goldblum | 524/46 |
| 3,780,139 | 12/1973 | Sutter et al. | 526/340 |
| 4,180,494 | 12/1979 | Fromuth et al. | 523/201 |
| 4,271,063 | 6/1981 | Borman et al. | 524/445 |
| 4,476,274 | 10/1984 | Liu | 524/445 |
| 4,639,481 | 1/1987 | Giles, Jr. | 524/128 |

*Primary Examiner*—Theodore E. Pertilla

[57] ABSTRACT

Environmental stress failure resistant and impact resistance thermoplastic molding compositions are prepared from an aromatic polycarbonate, an aromatic polyester, and a copolymer of ethylene and carbon monoxide.

16 Claims, No Drawings

ENVIRONMENTAL STRESS FAILURE RESISTANT POLYCARBONATE BLEND

FIELD OF THE INVENTION

This invention relates generally to polycarbonates, and more particularly, to environmental stress failure resistant and impact resistant polymer blends comprising a polycarbonate, a polyester and a copolymer of ethylene and carbon monoxide.

BACKGROUND OF THE INVENTION

Polycarbonates are well-known commercially available resinous materials having a variety of applications. They are typically prepared by the reaction of dihydroxy compounds with a carbonate precursor, such as phosgene, in the presence of a catalyst. Methods of direct phosgenation, interfacial condensation and transesterification, for the preparation of polycarbonates, are described in detail in "The Chemistry and Physics of Polycarbonates", by H. Schnell, John Wiley & Co., N.Y., 1964.

Polycarbonates are high temperature, high performance engineering thermoplastics having a combination of good thermal and mechanical properties, especially when prepared from one or more aromatic diols. The blending with polycarbonates of additional compounds, such as for example, other thermoplastic resins, copolymer rubber compounds, and the like, is commonly practiced in order to improve one or more properties of the homopolymer polycarbonate.

The applications for homopolycarbonates and blends of polycarbonates with other thermoplastic resinous compounds as engineering materials are limited because they generally exhibit severe environmental stress failure. By environmental stress failure is meant surface crazing or cracking, or disintegration of the molded piece resulting from its contact with organic solvents while under stress, such as may occur for example when solvents are used to clean or degrease stressed parts fabricated from polycarbonates or polycarbonate blends.

U.S. Patent No. 3,431,224 discloses a blend of a polycarbonate and a polyolefin such as polyethylene or an olefin copolymer such as ethylene/propylene, in order to improve the environmental stress failure resistance of the homopolycarbonate. U.S. Patent No. 4,180,494 discloses the use of a butadiene-based core-shell copolymer for improving the environmental stress failure resistance of a blend of polycarbonate and polyester resins.

Various other additives are disclosed in the art for modifying the properties of polycarbonate/polyester blends; U.S. Patent No. 4,476,274 discloses polyethylene and glass fibers for improved impact resistance; U.S. Patents Nos. 3,780,139 and 4,271,063 disclose a terpolymer of ethylene, carbon monoxide and a third component such as vinyl acetate for improved strength; U.S. Patent No. 4,639,481 discloses polyethylene or a polyolefin copolymer for improved impact resistance.

SUMMARY OF THE INVENTION

The present invention is directed toward a novel polymer blend, comprising an aromatic polycarbonate, an aromatic polyester, and a copolymer of ethylene and carbon monoxide. The blend surprisingly is highly impact resistant, and is likewise resistant to environmental stress failure.

The polymer blends of the present invention exhibit high impact resistance, chemical resistance, temperature stability, and excellent thermoplastic engineering properties, making them particularly suitable for producing molded plastic components for the automotive and electrical housing manufacturing industries.

DETAILED DESCRIPTION

The aromatic polycarbonates suitable for use in the present invention are produced by any of the conventional processes known in the art for the manufacture of polycarbonates. Generally, aromatic polycarbonates are prepared by reacting an aromatic dihydric phenol with a carbonate precursor, such as for example phosgene, a haloformate or a carbonate ester.

A preferred method for preparing the aromatic polycarbonates suitable for use in the present invention involves the use of a carbonyl halide, such as phosgene, as the carbonate precursor. This method involves passing phosgene gas into a reaction mixture containing an activated dihydric phenol, or a nonactivated dihydric phenol and an acid acceptor, such as for example pyridine, dimethyl aniline, quinoline and the like. The acid acceptor may be used undiluted or diluted with inert organic solvents, such as methylene chloride, chlorobenzene or 1,2-dichloroethane. Tertiary amines are advantageous since they are good solvents as well as acid acceptors during the reaction.

The temperature at which the carbonyl halide reaction proceeds may vary from below 0° C. to about 100° C. The reaction proceeds satisfactorily at temperatures from room temperature to 50° C. Since the reaction is exothermic, the rate of phosgene addition may be used to control the temperature of the reaction. The amount of phosgene required will generally depend upon the amount of dihydric phenols present. Generally speaking, one mole of phosgene will react with one mole of dihydric phenol to form the polycarbonate and two moles of HCl. The HCl is in turn taken up by the acid acceptor.

Another method for preparing the aromatic polycarbonates useful in the present invention comprises adding phosgene to an alkaline aqueous suspension of dihydric phenols. This is preferably done in the presence of inert solvents such as methylene chloride, 1,2-dichloroethane and the like. Quaternary ammonium compounds may be employed to catalyze the reaction.

Yet another method for preparing such aromatic polycarbonates involves the phosgenation of an agitated suspension of an anhydrous alkali salt of an aryl diol in a nonaqueous medium such as benzene, chlorobenzene or toluene. The reaction is illustrated by the addition of phosgene to a slurry of the sodium salt of, for example, Bisphenol A in an inert polymer solvent such as chlorobenzene.

Generally speaking, a haloformate such as the bishaloformate of Bisphenol A may be used in place of phosgene as the carbonate precursor in any of the methods described above.

When a carbonate ester is used as the carbonate precursor in the polycarbonate forming reaction, the materials are reacted at temperatures in excess of 100° C, for times varying from 1 to 15 hours. Under such conditions, ester interchange occurs between the carbonate ester and the dihydric phenol used. The ester interchange is advantageously consummated at reduced pressures on the order of from about 10 to about 100 millimeters of mercury, preferably in an inert atmosphere such as nitrogen or argon.

Although the polymer forming reaction may be conducted in the absence of a catalyst, one may, if desired, employ a typical ester exchange catalyst, such as metallic lithium, potassium, calcium or magnesium. The amount of such catalyst, if used, is usually small, ranging from about 0.001% to about 0.1%, based on the weight of the dihydric phenols employed.

In the solution methods of preparation, the aromatic polycarbonate emerges from the reaction in either a true or pseudo solution depending on whether an aqueous base or pyridine is used as an acid acceptor. The copolymer may be precipitated from the solution by adding a polymer nonsolvent, such as heptane or isopropanol. Alternatively, the polymer solution may be heated, typically under reduced pressure, to evaporate the solvent.

A preferred aromatic polycarbonate is characterized by repeated units corresponding to the general formula:

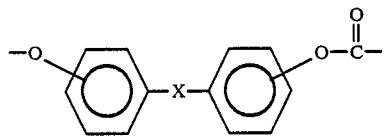
I wherein X is a divalent $C_1$-$C_{15}$ hydrocarbon radical, a single bond, —O—, —S—, —$S_2$—, —$SO_2$—, or —CO—. Each aromatic ring may additionally contain 1 or 2 substituents such as $C_1$-$C_4$ alkyl hydrocarbon radicals or halo radicals. A most preferred aromatic polycarbonate is prepared form 2,2-bis-(4-hydroxyphenyl)-propane (Bisphenol A).

The aforementioned methods of preparing aromatic polycarbonates are more fully set forth in U.S. Patents 2,999,846, 3,028,365, 3,148,172, 3,153,008, 3,248,414, 3,271,367, and 4,452,968, which are hereby incorporated in their entirety by reference thereto.

Also included in the term aromatic polycarbonate are the polycarbonate/polyester copolymers of the types disclosed in U.S. Patents Nos. 3,169,121, 4,105,633, 4,156,069, 4,260,731 and 4,287,787 which are incorporated herein in their entirety by reference thereto, as well as mixtures of polycarbonates and polycarbonate/-polyester copolymers.

The aromatic polyesters suitable for use according to the present invention may be generally prepared by condensing aromatic dicarboxylic acids with diols, or by condensing precursors which contain both an alcohol or phenol and a carboxylic acid. Suitable aromatic dicarboxylic acids include, for example, terephthalic acid, isophthalic acid, naphthalenedicarboxylic acid, diphenyletherdicarboxylic acid, diphenyldicarboxylic acid, diphenylsulfonedicarboxylic acid, diphenoxyethanedicarboxylic acid, and the like. Examples of suitable aromatic diols are hydroquinone, resorcinol, 2,2-bis-(4-hydroxyphenyl)propane, bis-(4-hydroxyphenyl)methane, 4,4'-thiodiphenol, bis-(4-hydroxyphenyl)sulfone, 4,4'-oxydiphenyl, 4,4'-dihydroxybiphenyl, and dihydroxynaphthalenes. The aliphatic diols suitable for preparation of the aromatic polyesters include, for example, ethylene glycol, 1,3-propylene glycol, 1,4-butanediol, 1,5-pentanediol, 1,6-hexanediol, cyclohexane dimethylol, and the like. Examples of precursors which contain both an alcohol and a carboxylic acid are 4-hydroxybenzoic acid and 2-hydroxy-6-naphthoic acid.

Polyesters may be prepared using any of the several well known methods, such as for example by the reaction of the acid chloride of a carboxylic acid with an alcohol or phenol in the presence of a base; dehydration of an acid and alcohol or phenol through physical or chemical means; reaction of the ester derivative of a carboxylic acid (such as a methyl or phenyl ester) with an alcohol or phenol; or reaction of a carboxylic acid with a derivative (such as an acetate) of an alcohol or phenol.

Contemplated equivalent polyesters, having the same operability and utility, may contain for example the following repeated mer units:

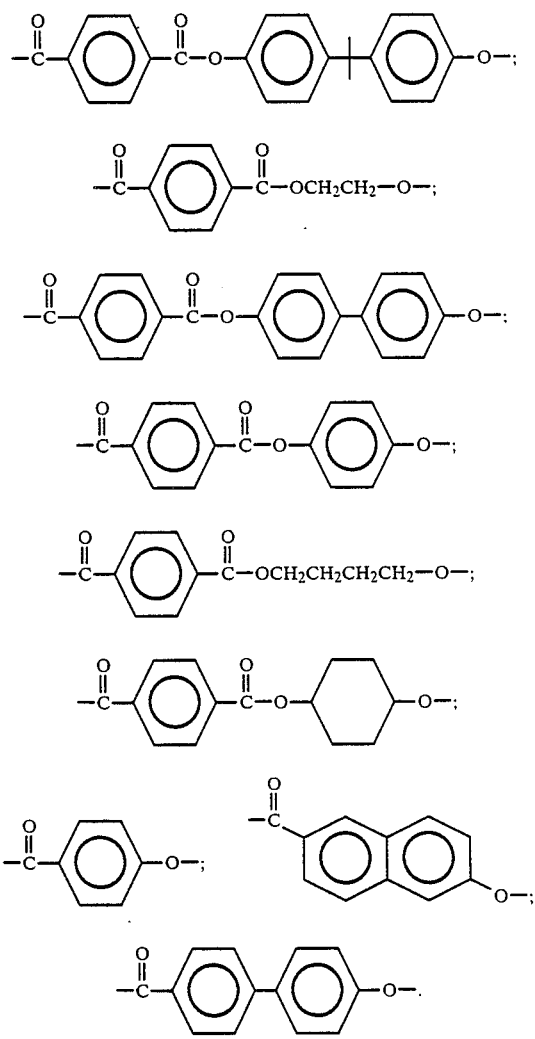

By the term polyester, as used in the present invention, is also contemplated copolyesters, which may be prepared by cocondensing one or more aromatic dicarboxylic acids with one or more diols. Also contemplated are liquid crystalline polyesters derived from mixtures of 4-hydroxybenzoic acid and 2-hydroxy-6-naphthoic acid; or mixtures of terephthalic acid, 4-hydroxybenzoic and ethylene glycol; or mixtures of terephthalic acid, 4-hydrobenzoic acid, and 4,4'-dihydroxybiphenyl.

A preferred polyester is characterized by repeated units corresponding to the general formula:

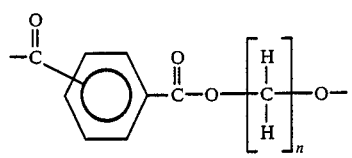

wherein n is selected from the numbers 2 through 6. a most preferred aromatic polyester is polyethylene terephthalate.

Specific methods of preparing aromatic polyesters and copolyesters are more fully set forth in U.S. Patents Nos. 2,465,319 and 3,047,539, which are hereby incorporated in their entirety by reference thereto.

The olefin/carbon monoxide copolymers of the present invention may be prepared by polymerizing ethylene with carbon monoxide, at an elevated temperature and pressure, in the presence of a catalyst such as a peroxy compound or azo compound. Specific procedures for preparing the copolymers are more fully set forth in U.S. Patents Nos. 3,495,285, 2,541,987, 4,024,325 and 4,024,326 which are incorporated herein in their entirety by reference thereto. the amount of carbon monoxide in the copolymer may be from about 0.1% to about 50% of the total weight of the copolymer; preferably it is about 2% to about 15% by weight.

The polymer blend of the present invention comprises about 5% to about 95%, preferably about 40% to about 85%, of an aromatic polycarbonate; about 60% to about 2%, preferably about 40% to about 3%, of an aromatic polyester; and about 0.1 to about 40%, preferably about 1% to about 25%, of an ethylene/carbon monoxide copolymer. The recited percentages are in relation to the total weight of the resinous blend. The components may be mixed in any order, by the use of any conventional mixing apparatus.

The polymer blends of polycarbonate, polyester and ethylene/carbon monoxide copolymer may obviously contain additional elastomeric impact modifiers, such as for example acrylonitrile-butadiene-styrene copolymers (ABS copolymers), methylmethacrylate-butadiene-styrene copolymers (MBS rubbers), hydrogenated styrene-butadiene copolymers, functionalized EPDM copolymers, acrylic latexes, polybutadiene, polyisoprene, polybutene, and the like. Surprisingly, these impact modifiers are better tougheners for polycarbonate/polyester blends containing the ethylene/carbon monoxide copolymer than for the same polycarbonate/polyester blends containing known polyolefins such as for example polyethylene.

The polymer blends of the present invention may furthermore contain conventional thermoplastic polymer additives, such as for example fillers, thermal stabilizers, dyes, flame retarding agents, reinforcing agents, softeners, mold-release agents, seed-forming agents, pigments, plasticizers, antistatic agents, ultraviolet radiation absorbers, lubricants, and the like, in conventional amounts generally not exceeding 50% of the total weight.

The invention is more easily comprehended by reference to specific embodiments which are representative of the invention. It must be understood, however, the the specific embodiments are provided only for the purposes of illustration and understanding, and that the invention may be practiced otherwise than as specifically illustrated and described without departing from its spirit and scope.

EXAMPLES 1-8

Dry blends comprising polycarbonate and polyester resins and ethylene/carbon monoxide copolymer were prepared in the proportions described in Table I (as were comparison compositions), and subsequently melt-mixed in a co-rotating twin screw extruder. The resulting polymer blend strands were quenched and pelletized, and the pellets injection molded into test specimens whose mechanical properties are described in Tables II and III.

TABLE I

| | COMPOSITIONS TESTED, WEIGHT % | | | | |
|---|---|---|---|---|---|
| | Polycarbonate[1] | Polyester[2] | E/CO Copolymer[3] | Polyethylene[4] | Impact Modifier[5] |
| Example 1 | 70 | 3 | 27 | | |
| Comparison 1 | 70 | 3 | | 27 | |
| Example 2 | 70 | 6 | 24 | | |
| Comparison 2 | 70 | 7 | | 24 | |
| Example 3 | 70 | 10 | 20 | | |
| Comparison 3 | 70 | 10 | | 20 | |
| Example 4 | 70 | 15 | 15 | | |
| Comparison 4 | 70 | 15 | | 15 | |
| Example 5 | 62 | 20 | 15 | | 3 |
| Example 6 | 57 | 20 | 15 | | 8 |
| Comparison 5 | 70 | 20 | | | 10 |
| Comparison 6 | 62 | 20 | | 15 | 3 |
| Comparison 7 | 57 | 20 | | 15 | 8 |
| Example 7 | 73 | 20 | 7 | | |
| Example 8 | 65 | 20 | 7 | | 8 |
| Comparison 8 | 73 | 20 | | 7 | |
| Comparison 9 | 65 | 20 | | 7 | 8 |
| Comparison 10 | 70 | 30 | | | |

[1]CALIBRE ® 300-10, aromatic polycarbonate manufactured by The Dow Chemical Company.
[2]Polyethylene terephthalate aromatic polyester.
[3]Copolymer of 90% ethylene and 10% carbon monoxide.
[4]Low density polyethylene.
[5]METABLEND ® C-223, MBS rubber manufactured by M & T Chemical Co.

TABLE II

| | DTUL[1] °F. @ 264 lb | Flex Mod[2] psi | Izod[3] ft-lb/in @ 73° F. | % Elongation Before Solvent[4] | % Elongation After Solvent[5] |
|---|---|---|---|---|---|
| Example 1 | 264 | 220,000 | 15.7 | 86 | 86 |
| Comparison 1 | 241 | 240,000 | 12.8 | 15 | 15 |
| Example 2 | 245 | 230,000 | 12.1 | 87 | 89 |
| Comparison 2 | 238 | 250,000 | 13.1 | 19 | 19 |
| Example 3 | 233 | 260,000 | 8.5 | 91 | 63 |
| Comparison 3 | 246 | 260,000 | 9.1 | 5 | 15 |
| Example 4 | 240 | 270,000 | 7.2 | 102 | 39 |
| Comparison 4 | 238 | 270,000 | 7.7 | 13 | 6 |
| Example 5 | 225 | 260,000 | 2.6 | 80 | 66 |
| Example 6 | 220 | 260,000 | 7.0 | 66 | 60 |
| Comparison 5 | 246 | 290,000 | 13.6 | 93 | 2 |
| Comparison 6 | 226 | 260,000 | 3.9 | 15 | 17 |
| Comparison 7 | 218 | 260,000 | 4.7 | 16 | 13 |
| Comparison 10 | 248 | 280,000 | 1.8 | 119 | 2 |

[1]Deflection Temperature Under Load ASTM D 648.
[2]Flexural Modulus, ASTM D 790.
[3]Izod impact, specimens having 10 mil notch, ASTM D 256.
[4]Tensile % elongation at break, ASTM D 638.
[5]Tensile % elongation at break, after 5 minutes under 0.7% strain in 60/40 weight % isooctane/toluene, ASTM D 638.

TABLE III

| | Falling Dart[1] Impact, Passes in-lb | Falling Dart[1] Impact, Fails in-lb |
|---|---|---|
| Example 7 | 448 | 464 |
| Example 8 | 288 | 304 |
| Comparison 8 | 384 | 400 |
| Comparison 9 | 232 | 240 |

[1]Test conducted by dropping 16 lb weight over the center of a 6.5 inch by 2.5 inch injection molded plaque. The load falls freely inside a slotted vertical guide tube on the top of a round-nose punch having a 0.500 inch diameter point. The specimen is placed on an aluminum cast base with a 0.640 inch hole to accept the punch after it penetrates the sample. The instrument is a Pacific Scientific model #IG-1120. The sample fails if it shows a crack on the tension side.

The percent elongation at break values for polymer compositions containing the copolymer of ethylene and carbon monoxide are superior to those for corresponding formulations utilizing polyethylene. The retention of properties after treatment in a synthetic gasoline is reasonable up to about 15% polyester content. More delamination is observed for blends containing polyethylene than those containing the ethylene/carbon monoxide copolymer. Furthermore, the impact modifier is surprisingly a more efficient toughener for the blends containing the ethylene/carbon monoxide copolymer than for blends containing polyethylene, as demonstrated by the notched Izod impact and falling dart impact results.

What is claimed is:

1. A thermoplastic molding composition, comprising:
A. an aromatic polycarbonate;
B. an aromatic polyester; and
C. a copolymer of ethylene and carbon monoxide.

2. The thermoplastic molding composition of claim 1, wherein the aromatic polycarbonate is characterized at least in part by repeated units corresponding to the general formula:

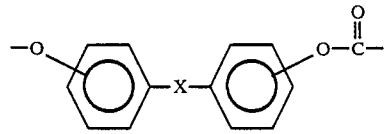

wherein X is a divalent $C_1$–$C_{15}$ hydrocarbon radical, a single bond, —O—, —S—, —$S_2$—, —SO—, —$SO_2$—, or —CO—, and further wherein each aromatic ring may optionally contain 1 or 2 $C_1$–$C_4$ alkyl hydrocarbon radical or halo radical substituents.

3. The thermoplastic molding composition of claim 2, wherein the aromatic polycarbonate is prepared at least in part from Bisphenol A.

4. The thermoplastic molding composition of claim 1, wherein the aromatic polyester is characterized at least in part by repeated units corresponding to the general formula:

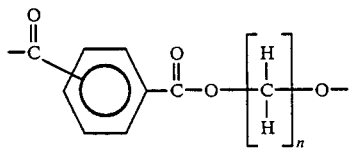

wherein n is selected from the numbers 2 through 6.

5. The thermoplastic molding composition of claim 4, wherein the aromatic polyester is at least in part polyethylene terephthalate.

6. The thermoplastic molding composition of claim 1, wherein the copolymer of ethylene and carbon monoxide comprises about 0.1% to about 50% by weight carbon monoxide.

7. The thermoplastic molding composition of claim 6, wherein the copolymer of ethylene and carbon monoxide comprises about 2% to about 15% by weight carbon monoxide.

8. The thermoplastic molding composition of claim 1, wherein the aromatic polycarbonate comprises about 5% to about 95% of the composition, based upon the total weight of polymers.

9. The thermoplastic molding composition of claim 8, wherein the aromatic polycarbonate comprises about 40% to about 85% of the composition, based upon the total weight of polymers.

10. The thermoplastic molding composition of claim 1, wherein the aromatic polyester comprises about 60% to about 2% of the composition, based upon the total weight of polymers.

11. The thermoplastic molding composition of claim 10, wherein the aromatic polyester comprises about 40% to about 3% of the composition, based upon the total weight of polymers.

12. The thermoplastic molding composition of claim 1, wherein the copolymer of ethylene and carbon monoxide comprises about 0.1% to about 40% of the composition, based upon the total weight of polymers.

13. The thermoplastic molding composition of claim 12, wherein the copolymer of ethylene and carbon monoxide comprises about 1% to about 25% of the composition, based upon the total weight of polymers.

14. The thermoplastic molding composition of claim 1, further comprising an elastomeric impact modifier.

15. The thermoplastic molding composition of claim 14, wherein the elastomeric impact modifier is selected from the group consisting of acrylonitrile-butadiene-styrene copolymers, methylmethacrylate-butadiene-styrene copolymers, hydrogenated styrene-butadiene copolymers, functionalized EPDM copolymers, acrylic latexes, polybutadiene, polyisoprene and polybutene.

16. The thermoplastic molding composition of claim 15, wherein the elastomeric impact modifier is a methylmethacrylate-butadiene-styrene copolymer.

* * * * *

UNITED STATES PATENT AND TRADEMARK OFFICE
CERTIFICATE OF CORRECTION

PATENT NO. : 4,859,738

DATED : August 22, 1989

INVENTOR(S) : Hani Farah; Chai Jing Chou; and Don R. Roden, Jr.

It is certified that error appears in the above-identified patent and that said Letters Patent is hereby corrected as shown below:

On the title page, number [57], "ABSTRACT" should correctly appear as --ABSTRACT OF THE DISCLOSURE--.

Column 3, line 31, insert -- -SO- -- between $-S_2-$ and $-SO_2-$.

Column 5, line 11, "a" should correctly appear as --A--.

Signed and Sealed this

Twenty-fifth Day of September, 1990

Attest:

HARRY F. MANBECK, JR.

*Attesting Officer*     *Commissioner of Patents and Trademarks*